United States Patent
Nagatani

(10) Patent No.: US 10,477,045 B2
(45) Date of Patent: Nov. 12, 2019

(54) INFORMATION PROCESSING APPARATUS AND INFORMATION PROCESSING METHOD FOR CONNECTING TO A DEVICE THAT IS SPECIFIED AFTER DISPLAYING A MESSAGE RELATING TO A STATUS CHANGE

(71) Applicant: CANON KABUSHIKI KAISHA, Tokyo (JP)

(72) Inventor: Masahiro Nagatani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/135,345

(22) Filed: Sep. 19, 2018

(65) Prior Publication Data
US 2019/0020775 A1    Jan. 17, 2019

Related U.S. Application Data

(63) Continuation of application No. 15/151,517, filed on May 11, 2016, now Pat. No. 10,142,500.

(30) Foreign Application Priority Data

May 29, 2015    (JP) ................. 2015-110809

(51) Int. Cl.
  *G06F 3/12*    (2006.01)
  *H04N 1/00*    (2006.01)
  *G06K 15/00*    (2006.01)
  *H04L 29/08*    (2006.01)
  (Continued)

(52) U.S. Cl.
  CPC ....... *H04N 1/00477* (2013.01); *G06K 15/007* (2013.01); *H04L 67/16* (2013.01); *H04N 1/00204* (2013.01); *H04N 1/00408* (2013.01); *G06F 3/1231* (2013.01); *G06F 3/1236* (2013.01); *G06F 3/1276* (2013.01); *G06F 3/1287* (2013.01); *G06F 3/1292* (2013.01); *H04L 61/6022* (2013.01); *H04L 67/36* (2013.01); *H04W 12/06* (2013.01)

(58) Field of Classification Search
None
See application file for complete search history.

(56) References Cited

U.S. PATENT DOCUMENTS 7,096,280 B2    8/2006    Aoki et al.
7,268,897 B1    9/2007    Moro et al.
(Continued)

FOREIGN PATENT DOCUMENTS

| JP | 2006018468 A | 1/2006 |
| JP | 2011-186725 A | 9/2011 |
| JP | 2015060383 A | 3/2015 |

OTHER PUBLICATIONS

Japanese Office Action issued in corresponding Japanese Application No. 2015/110809 dated Oct. 9, 2018.

*Primary Examiner* — Miya J Williams
(74) *Attorney, Agent, or Firm* — Venable LLP

(57) ABSTRACT

A device that is in a state of preparing for connection with a network is searched for (first search), and a device that is already connected to the network is searched for (second search). A display unit is caused to display information regarding a device found in the first search and information regarding a device found in the second search, such that a distinction is made.

16 Claims, 7 Drawing Sheets

(51) Int. Cl.
*H04L 29/12* (2006.01)
*H04W 12/06* (2009.01)

(56) References Cited

U.S. PATENT DOCUMENTS

| | | | |
|---|---|---|---|
| 2006/0224707 A1* | 10/2006 | Kawai | H04L 41/0803 709/220 |
| 2007/0279666 A1 | 12/2007 | Lee et al. | |
| 2010/0142502 A1* | 6/2010 | Shiraki | H04W 12/06 370/338 |
| 2010/0238493 A1 | 9/2010 | Sako et al. | |
| 2010/0253976 A1* | 10/2010 | Kasai | G06F 3/1204 358/1.15 |
| 2011/0116129 A1 | 5/2011 | Onishi | |
| 2011/0216355 A1 | 9/2011 | Takei et al. | |
| 2012/0182432 A1 | 7/2012 | Okamoto et al. | |
| 2013/0094045 A1 | 4/2013 | Nakata | |
| 2014/0362841 A1* | 12/2014 | Shibata | H04W 48/18 370/338 |
| 2015/0081050 A1* | 3/2015 | Miwa | G05B 15/02 700/83 |
| 2015/0154482 A1 | 6/2015 | Kawai | |
| 2016/0080604 A1 | 3/2016 | Yamada | |

* cited by examiner

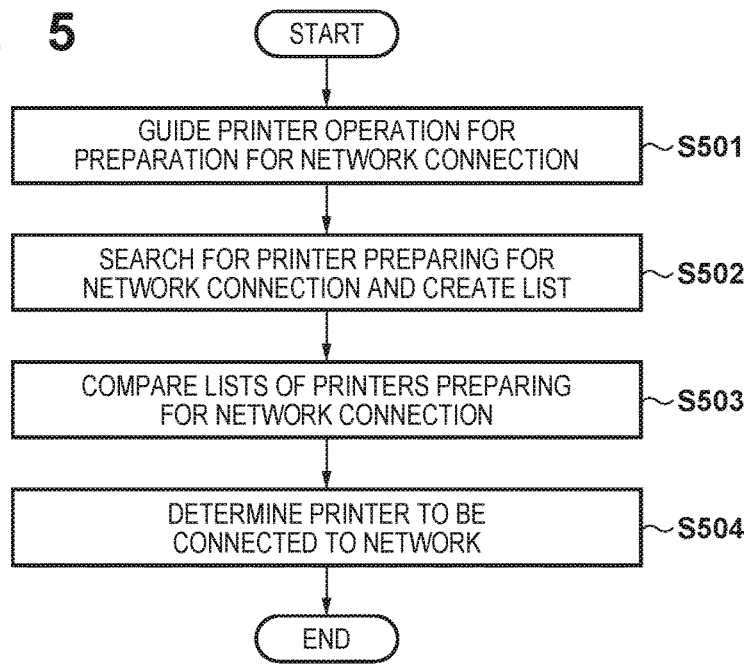

FIG. 9

| | SETUP SELECTION | |
|---|---|---|
| SET UP PRINTER FOR THE FIRST TIME | | |
| CONNECT TO SECOND AND SUBSEQUENT PCS | | |
| SERIAL NUMBER | IP ADDRESS | MAC ADDRESS |
| ☐ 12346 | 192.168.1.3 | 11.22.33.44.55.66 |
| ☐ 12347 | 192.168.1.4 | 11.22.33.44.55.67 |

RETURN    NEXT

INFORMATION PROCESSING APPARATUS AND INFORMATION PROCESSING METHOD FOR CONNECTING TO A DEVICE THAT IS SPECIFIED AFTER DISPLAYING A MESSAGE RELATING TO A STATUS CHANGE

CROSS-REFERENCE TO RELATED APPLICATIONS

This application is a continuation of U.S. patent application Ser. No. 15/151,517, filed May 11, 2016, which claims priority to Japanese Patent Application No. 2015-110809, filed May 29, 2015, the entire disclosures of which are hereby incorporated herein by reference.

BACKGROUND

Field of the Invention

The present invention relates to techniques for connecting a device to a network.

Description of the Related Art

Conventionally, when connecting a network communication device and a terminal device to each other, connection is established via a connection device called a wireless LAN router, which is also called an access point. Here, the network communication device refers to a printer or the like that can be used in a network, and a terminal device will hereinafter mean a personal computer, a smartphone, or the like. For the connection, a procedure in which, initially, the network communication device and the wireless LAN router are connected to each other, and thereafter the network communication device is searched for from the terminal device is necessary.

Techniques for connecting the network communication device and the wireless LAN router to each other include push-button methods that conform to standards of wireless LAN router manufacturers or the Wi-Fi Alliance. In Japan, AOSS is one of the push-button methods. AOSS is an abbreviation of AirStation One-Touch Secure System, which is a wireless LAN setting system that is introduced in a wireless LAN device "AirStation" that is sold by Buffalo. In Japan, the push-button methods also include Raku-raku Wireless Start, which is an automatic wireless LAN setting developed by NEC Access Technica. Worldwide, WPS (Wi-Fi Protected Setup: the standards of the Wi-Fi Alliance) is available as a push-button method. In the case where a network communication device has a wireless LAN router search function and a network communication device listing function, the following method is also available. That is to say, a wireless LAN router is searched for from each network communication device, and the connection is established by designating an SSID (an identifier of the wireless LAN router: Service Set Identifier) and a password of the wireless LAN router to be used. In addition, there is also a method for connecting a wireless LAN router and a network communication device to each other using a connection tool provided in the terminal device. There is also a technique with which software in a PC searches for printers and a printer list is displayed (Japanese Patent Laid-Open No. 2011-186725).

Although wireless LAN routers have been widely used in recent years, many technical terms are used in the settings thereof and the connection between the wireless LAN routers and other devices, and there are cases where users are not aware of even the existence of the wireless LAN routers in the case where providers install them. In the push-button methods (AOSS, Raku-raku Wireless Start, WPS etc.) for the wireless LAN routers of various manufacturers, the setting method and the position of the push button differ, and moreover, in recent years, wireless LAN routers have increased in variety, which has made it difficult for users to perform the setting thereof for connection.

In this regard, a method by which a tool for connecting to a wireless LAN router is installed in a terminal device, and the wireless LAN router and a network communication device are connected to each other from the terminal device is known. However, in this case as well, the network communication device needs to be in a connection preparation mode, and it is necessary to perform an operation using a panel and buttons on the network communication device for connection, and establish connection using a tool from the terminal device after changing the mode of the network communication device to the connection preparation mode.

SUMMARY OF THE INVENTION

The present invention has been made in view of the foregoing problem, and provides a technique for connecting a device to a network with a simple method.

According to the first aspect of the present invention, there is provided an information processing apparatus comprising: a first search unit configured to search for a device that is in a state of preparing for connection with a network; a second search unit configured to search for a device that is already connected to the network; and a display control unit configured to cause a display unit to display information regarding a device found by the first search unit and information regarding a device found by the second search unit, such that a distinction is made.

According to the second aspect of the present invention, there is provided an information processing method performed by an information processing apparatus, comprising: searching for a device that is in a state of preparing for connection with a network; searching for a device that is already connected to the network; and causing a display unit to display information regarding the device that is in a state of preparing for connection with the network, and information regarding the device that is already connected to the network, such that a distinction is made.

According to the third aspect of the present invention, there is provided a non-transitory computer-readable storage medium storing a computer program for causing a computer to function as: a first search unit configured to search for a device that is in a state of preparing for connection with a network; a second search unit configured to search for a device that is already connected to the network; and a display control unit configured to cause a display unit to display information regarding a device found by the first search unit and information regarding a device found by the second search unit, such that a distinction is made.

Further features of the present invention will become apparent from the following description of exemplary embodiments with reference to the attached drawings.

BRIEF DESCRIPTION OF THE DRAWINGS

FIG. 5 is a flowchart showing the details of processing in step S409.

FIG. 6 is a diagram showing an exemplary display of a window.

FIG. 9 is a diagram showing an exemplary display of a user interface.

DESCRIPTION OF THE EMBODIMENTS

First Embodiment

An exemplary information processing apparatus having the following configuration will be described below. That is to say, a device that is in a state of preparing for connection with a network is searched for (first search), and a device that is already connected to this network is searched for (second search). A display unit is caused to display information regarding the device found in the first search and information regarding the device found in the second search such that a distinction is made (display control).

Figure 1:
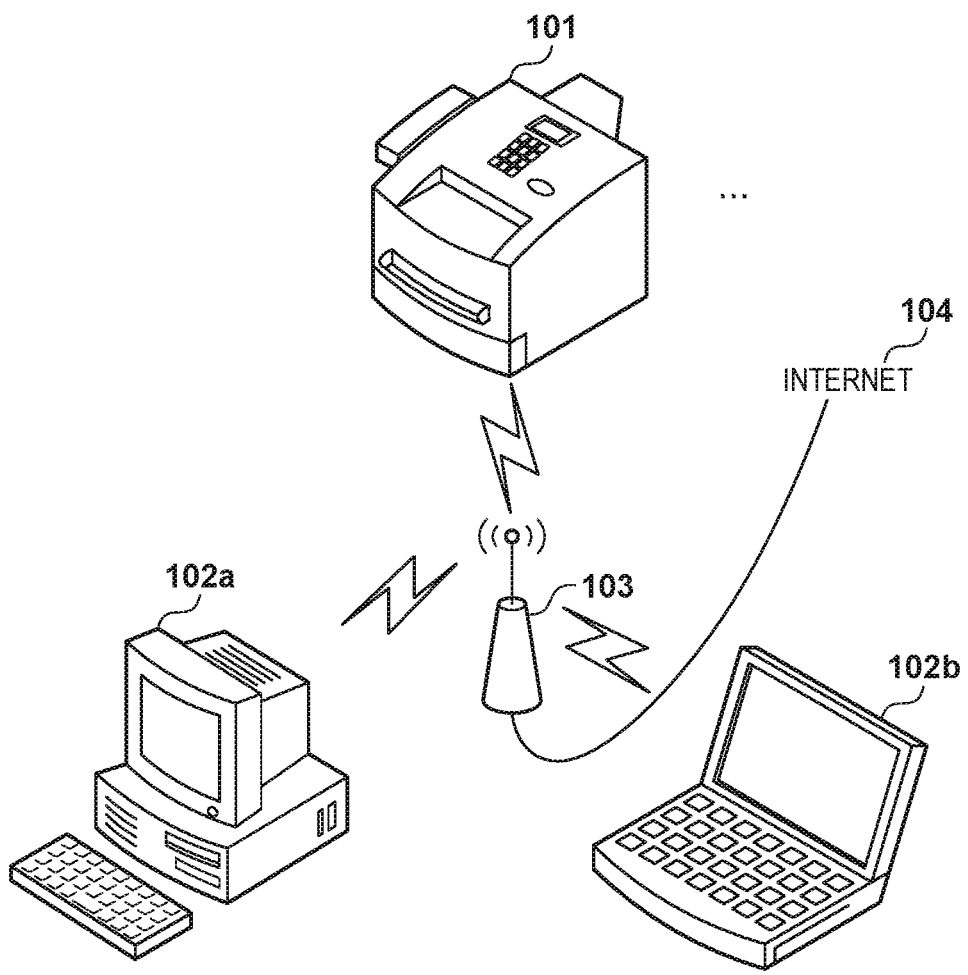
FIG. 1 is a diagram showing an exemplary configuration of a system.

First, an exemplary configuration of a system that is applicable to this embodiment is shown in FIG. 1. Both a desktop computer 102a and a laptop computer 102b are examples of the aforementioned information processing apparatus that communicate data with a printing device 101 via a wireless LAN router 103 and access the Internet 104. Note that although only one printing device 101 is shown in FIG. 1, it is assumed that a plurality of printing devices 101 that are already connected to the wireless LAN router 103 or preparing for connection are included in the system, as described later. The configuration shown in FIG. 1 is merely an exemplary configuration of a system applicable to this embodiment, and for example, any type and any number of computer devices may be applicable to the aforementioned information processing apparatuses. A communication partner of the aforementioned information processing apparatuses is not limited to being a printing device, and may be a scanner device or may be a multifunction peripheral, for example.

Next, a description will be given, using block diagrams in FIGS. 2A and 2B, of exemplary hardware configurations of the printing device 101 and an information processing apparatus 201 that is applicable to the desktop computer 102a and the laptop computer 102b shown in FIG. 1.

First, an exemplary hardware configuration of the information processing apparatus 201 will be described using the block diagram in FIG. 2A. The mouse 210 and the keyboard 209 are exemplary user interfaces that are operated by a user in order to perform various kinds of input to the information processing apparatus 201, and are both connected to an input interface 202.

A CPU 203 executes processing using a computer program and data that are stored in a ROM 204 or a RAM 205, thereby controlling overall operations of the information processing apparatus 201 and executing or controlling each process that will be described later as processing performed by the information processing apparatus 201. Setting data, a boot program, and the like for the information processing apparatus 201 are stored in the ROM 204.

A display unit 208 is constituted by a CRT, a liquid crystal screen, or the like, and can display a result of the processing performed by the CPU 203 with images, characters, or the like. The display unit 208 is connected to an output interface 207.

The RAM 205 has an area for storing a computer program and data that are loaded from an external storage device 206, and various kinds of data received from the outside via a network interface 211. Furthermore, the RAM 205 has a work area that is used when the CPU 203 executes various kinds of processing. That is to say, the RAM 205 can provide various areas as appropriate.

The external storage device 206 is a large-capacity information storage device, such as a hard disk drive device. The external storage device 206 stores an OS (operating system), and a computer program and data for causing the CPU 203 to execute each process that will be described later as processing performed by the information processing apparatus 201. This computer program includes driver software for various network devices including the printing device 101, and installers for such devices. The computer program and data stored in the external storage device 206 are loaded into the RAM 205 as appropriate in accordance with the control performed by the CPU 203, and are to be processed by the CPU 203.

Figure 2A:
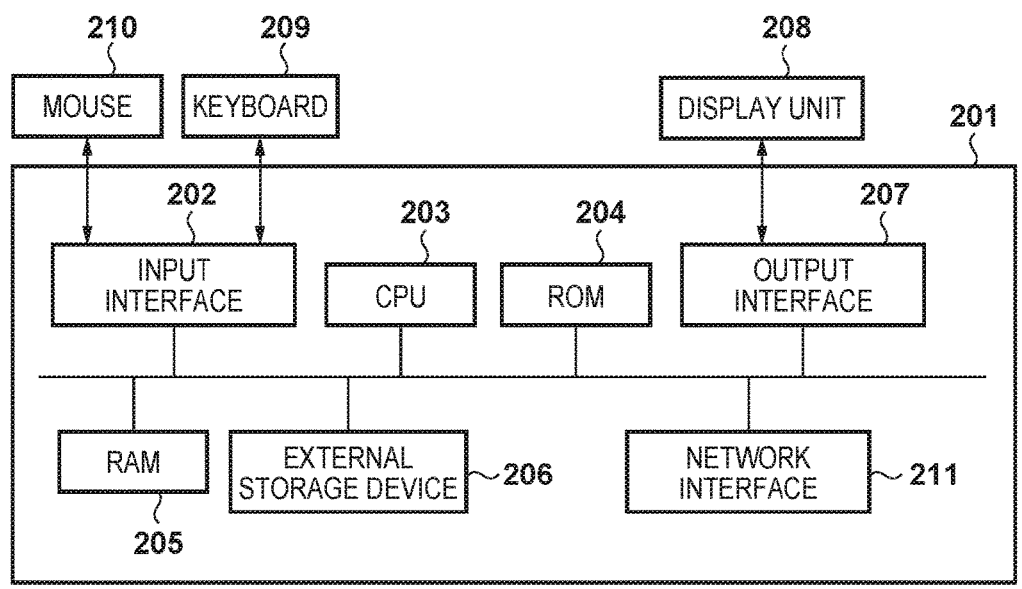
FIG. 2A is a block diagram showing an exemplary hardware configuration of an information processing apparatus 201.
Figure 2B:
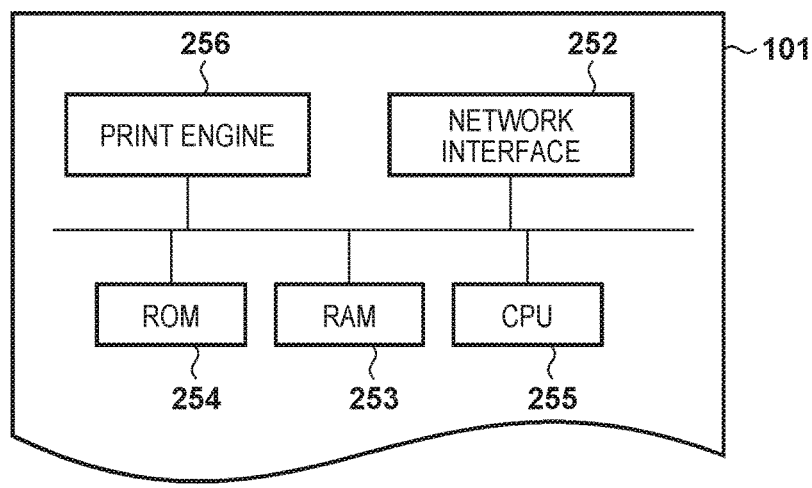
FIG. 2B is a block diagram showing an exemplary hardware configuration of a printing device 101.

The network interface 211 is a communication interface for communicating with external devices including the printing device 101 in FIG. 2B.

Note that although the information processing apparatus 201 is connected to the mouse 210, the keyboard 209, and the display unit 208 in this embodiment, these members may be provided within the information processing apparatus 201.

Next, an exemplary hardware configuration of the printing device (printer) 101 will be described using the block diagram in FIG. 2B. The print engine 256 prints images and characters on a recording medium, such as paper, based on print data that is supplied from the outside.

A network interface 252 is a communication interface for communicating data with external devices including the information processing apparatus 201 in FIG. 2A.

A ROM 254 stores setting data for the printing device 101, and a computer program and data for causing a CPU 255 to execute or control each process that will be described later as processing performed by the printing device 101. The computer program and data stored in the ROM 254 are loaded into the RAM 253 as appropriate in accordance with the control performed by the CPU 255, and are to be processed by the CPU 255.

The RAM 253 has an area for storing a computer program and data that are loaded from the ROM 254, and data that is received from the outside via the network interface 252. Furthermore, the RAM 253 has a work area that is used when the CPU 255 executes various kinds of processing. Thus, the RAM 253 can provide various areas as appropriate.

The CPU 255 controls overall operations of the printing device 101 and executes or controls each process that will be described later as processing performed by the printing device 101, by executing processing using the computer program and data stored in the RAM 253.

Next, a description will be given, using a flowchart in FIG. 3, of processing performed by the information processing apparatus 201 in order to install driver software for the printing device 101 that is selected by a user in the information processing apparatus 201.

Upon the user operating the keyboard 209 or the mouse 210 to input an instruction to start a setup program, the CPU 203 loads this setup program from the external storage device 206 into the RAM 205 and executes it. This setup program is for achieving functions such as a search for the printing device 101 in the network, connection control for connecting the printing device 101 to the wireless LAN router 103, and installation of driver software for the printing device 101 in the information processing apparatus 201.

For installation of driver software, an application, or the like in the external storage device 206, a setup program for installing such software is included in a CD medium that is prepared together with the printing device 101. A network connection program is provided as a part of the function of this setup program.

Figure 3:
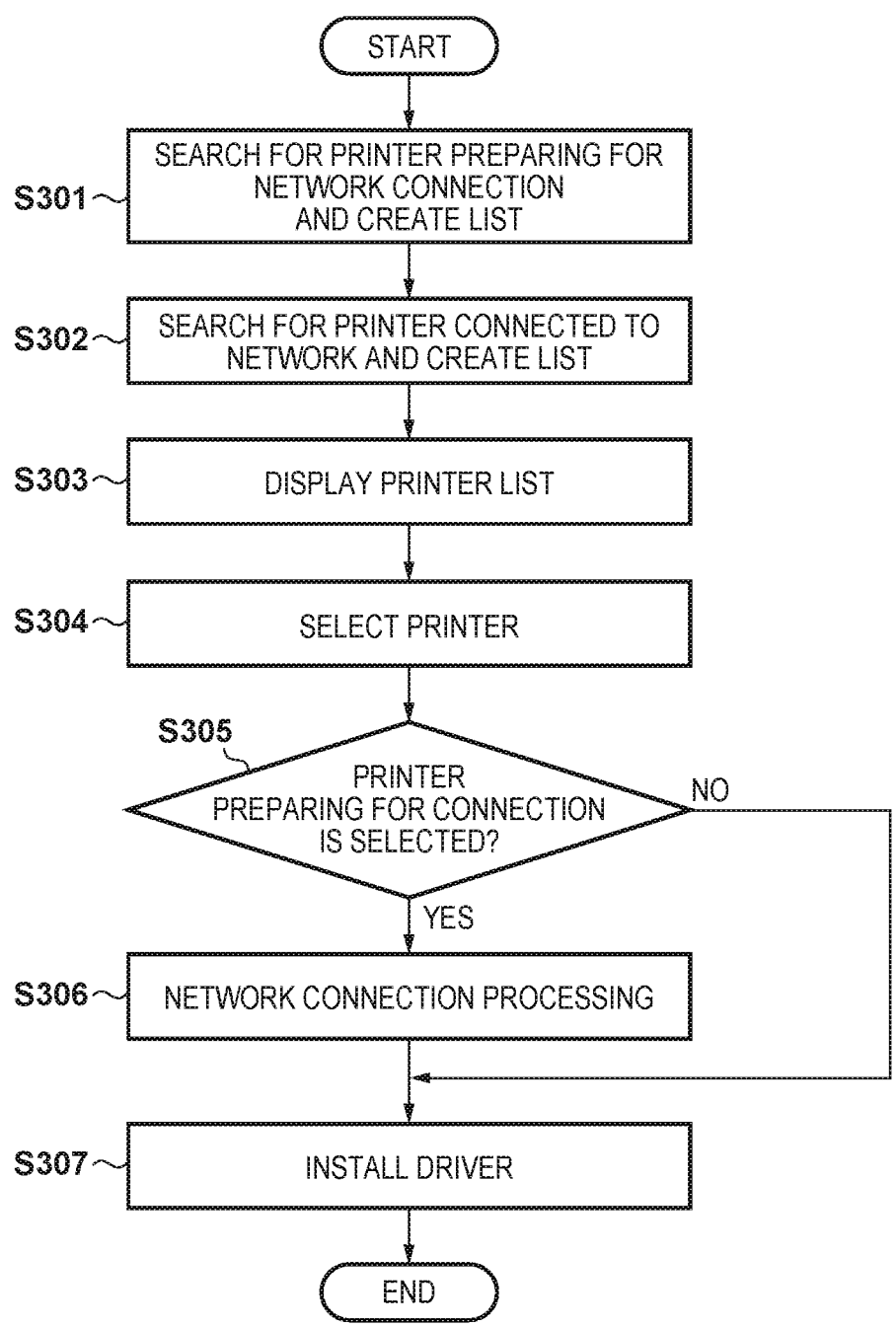
FIG. 3 is a flowchart of processing performed by the information processing apparatus 201.

FIG. 3 is a flowchart showing a processing flow of the network connection program, which is stored in the external storage device 206 of the information processing apparatus 201. The procedure in FIG. 3 is achieved by the CPU 203 executing the network connection program loaded into the RAM 205.

In step S301, the CPU 203 collects an SSID of the printing device 101 in a state of preparing for connection with the wireless LAN router 103 (which has not yet established connection with the wireless LAN router 103), via the network interface 211. This printing device 101 is a printing device 101 that is not yet in a printable state, and is a printing device 101 having an access point function. This printing device 101 is also a printing device 101 that can be recognized as an access point capable of being connected to the wireless LAN router 103 from the information processing apparatus 201. In this embodiment, the SSID of the printing device 101 is configured to represent information indicating the name of the printing device 101 and a serial number of the printing device 101. For example, the SSID of the printing device 101 whose name is "ABC1000" and whose serial number is "12345" is configured as "ABC1000_12345".

In step S301, the CPU 203 creates, based on the collected SSID, a list of the serial number and an MAC address of the printing device 101 that correspond to this SSID. For example, assume that an SSID "ABC1000_12345" is collected in step S301. At this time, the CPU 203 can identify the serial number of the printing device 101 corresponding to this SSID as "12345", and uniquely identify the printing device 101 from the name "ABC1000" and the serial number "12345" of the printing device 101. If the printing device 101 can be uniquely identified, corresponding driver software can be uniquely identified, and thus, the MAC address of this printing device 101 is acquired from the uniquely identified driver software. Note that the MAC address may be acquired from other files related to the printing device 101.

Thus, in step S301, the serial number and the MAC address of the corresponding printing device 101 are acquired based on the collected SSID. Note that the method for acquiring the serial number and the MAC address of the corresponding printing device 101 based on the collected SSID is not limited to the above method.

In step S302, the CPU 203 collects an SSID and an IP address of a printing device 101 that is already connected to the wireless LAN router 103 (i.e., that has established connection with the wireless LAN router 103). This printing device 101 is a printing device 101 in a printable state. In step S301, the CPU 203 collects the SSID and the IP address of such a printing device 101 using a technique such as broadcasting.

In step S302, the CPU 203 creates, based on the collected SSID and IP address, a list of the serial number, the IP address, and the MAC address of the printing device 101 corresponding to this SSID. The method for acquiring the serial number and the MAC address of the corresponding printing device 101 based on the collected SSID is the same as that in step S301.

In step S303, the CPU 203 displays a window, an example of which is shown in FIG. 6, on the display unit 208, thereby displaying the list created in step S301 and the list created in step S302 on the display unit 208. A display region 604 is a region for displaying the lists of the serial number, the IP address, and the MAC address of each printing device 101 created in steps S301 and S302.

In the first row in the display region 604, a list created based on the SSID collected in step S301 is displayed. More specifically, a serial number "12345" and an MAC address "11.22.33.44.55.65" of the printing device 101 having this serial number are displayed. The printing device 101 displayed in the first row is preparing for connection with the wireless LAN router 103 as mentioned above, and the IP address thereof has not yet been determined. That is to say, since the IP address is not acquired, information "–" indicating it is displayed as the IP address.

In the second row in the display region 604, a list created based on the SSID and the IP address collected in step S302 are displayed. More specifically, the serial number "12346", the collected IP address "192.168.1.3", and the MAC address "11.22.33.44.55.66" of the printing device 101 having this serial number are displayed.

In the third row in the display region 604, a list created based on the SSID and the IP address collected in step S302 are displayed. More specifically, the serial number "12347", the collected IP address "192.168.1.4", and the MAC address "11.22.33.44.55.67" of the printing device 101 having this serial number are displayed.

Note that, although the list created in step S301 and the lists created in step S302 are displayed in this order starting from the top in FIG. 6, the order of display is not limited thereto. The information to be displayed is not limited to the above information.

As mentioned above, the IP address of the printing device in a connection preparation state is not displayed, and the IP address of the connected printing device is displayed. That is to say, device information is displayed so as to distinguish between the printing device in a connection preparation state and the connected printing device. The method for this display with distinction is not limited thereto, and other methods may also be used. For example, a configuration may be employed in which a character string or an image indicating a connection preparation state is displayed near the list collected in step S301, and a character string or an image indicating a connected state is displayed near the list collected in step S302. The list collected in step S301 and the list collected in step S302 may be displayed with different character colors, or may be displayed with different fonts. That is to say, the list collected in step S301 and the list collected in step S302 may be displayed in different display forms.

Check boxes 601 to 603 are arranged in the respective rows in the display region 604, and the user designates (checks) a check box that corresponds to the printing device 101 that the user wants to connect to the wireless LAN router 103 by operating the keyboard 209 or the mouse 210. In the case of using the printing device 101 immediately after it is taken out from a package, only one printing device 101 can be searched for from the information processing apparatus 201 by automatically setting the network connection preparation mode at the time of initial start, and in this case, this printing device 101 may be in a checked state.

In step S304, after the user operates the keyboard 209 or the mouse 210 to designate any of the check boxes, the CPU 203 accepts an operation input for indicating the end of designation. In the case of FIG. 6, after any of the check boxes is designated, the CPU 203 accepts input for designating a "Next" button. Thus, the printer is selected.

Then, upon the user operating the keyboard 209 or the mouse 210 to designate any of the check boxes and thereafter indicating the end of designation, in step S305, the CPU 203 performs the following determination processing. That is to say, it is determined whether or not the printing device 101 corresponding to the designated check box is a printing device 101 that is preparing for connection with the wireless LAN router 103, i.e., whether or not the check box in the row of the list created in step S301 has been designated.

If the result of this determination is that the printing device 101 corresponding to the designated check box is a printing device 101 that is preparing for connection with the wireless LAN router 103, the processing proceeds to step S306. On the other hand, if the printing device 101 corresponding to the designated check box is a printing device 101 that is already connected to the wireless LAN router 103, i.e., if the check box in the row of the list created in step S302 is designated, the processing proceeds to step S307.

Figure 8:
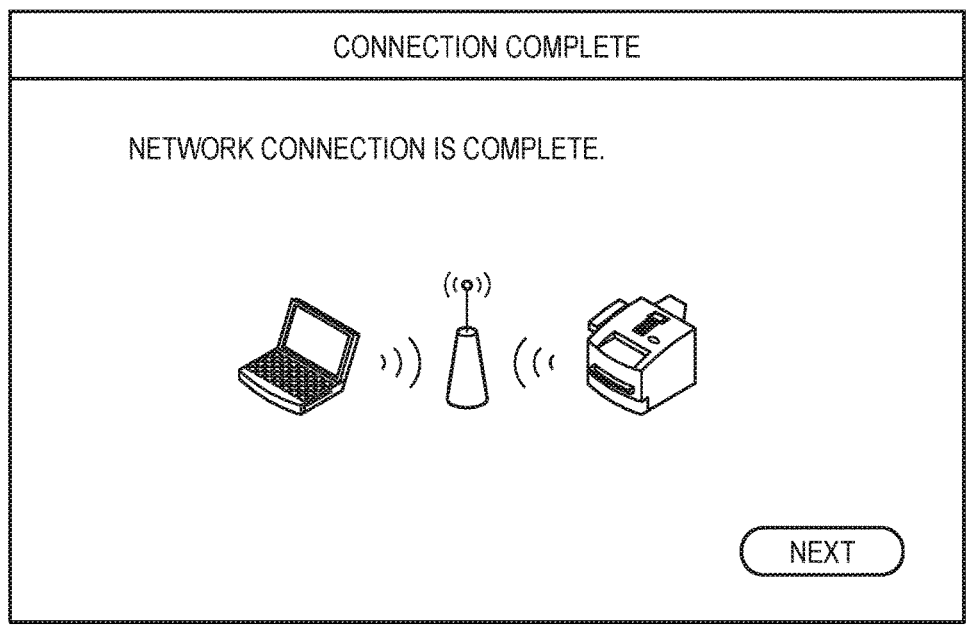
FIG. 8 is a diagram showing an exemplary display of a window.

In step S306, the CPU 203 initially performs processing for disconnecting from the wireless LAN router 103. Then, the CPU 203 transmits the SSID and the password used when establishing the connection with the wireless LAN router 103 to a target printing device (the printing device 101 corresponding to the designated check box: a device of interest) in an ad hoc mode. At this time, the CPU 203 gives the target printing device an instruction to connect to the wireless LAN router 103 using the transmitted SSID and password in an infrastructure mode. Thereafter, the CPU 203 disconnects from the target printing device, and again performs processing for establishing connection with the wireless LAN router 103. Upon this processing being completed, the CPU 203 causes the display unit 208 to display a window for giving notification that the processing, an example of which is shown in FIG. 8, has been completed.

In step S307, the CPU 203 installs driver software for the target printing device in the information processing apparatus 201 by executing an installer of the target printing device.

This embodiment has given a description taking a system using wireless communication via the wireless LAN router 103 as an example. However, this embodiment can also be similarly applied to a system in which the printing device 101 and the information processing apparatus 201 directly communicate with each other not via the wireless LAN router 103. Furthermore, the communication is not limited to wireless communication, and wired communication is also available. The information processing apparatus 201 is not limited to the desktop computer 102a and the laptop computer 102b in FIG. 1, and may also be a portable communication device such as a smartphone or a tablet.

The processing described as processing performed by the information processing apparatus 201 and the processing described as processing performed by the printing device 101 are not limited to processing by this apparatus and device as described above, and part of the processing may be executed by other devices.

For example, if, as shown in FIG. 9, printing devices are displayed in a state where it is unclear whether connection processing is to be performed from now or connection settings have already been configured in the network, it is difficult to select and set an appropriate printing device. In the case of FIG. 9, the user needs to install software in the terminal device after checking whether the connection processing is to be performed from now for the printing devices or connection settings for these printing devices have already been configured in the network, and selecting either one of the printing devices. On the other hand, in this embodiment, the information processing apparatus 201 searches for printing devices and displays a list of found printing devices. Furthermore, a printing device that is preparing for connection and a printing device that is already connected to the network are displayed such that a distinction is made. Thus, the user can easily complete settings by installing driver software in the information processing apparatus, and connect the printing device 101 to the network.

Furthermore, for example, there are cases where a display screen of the display unit of the printing device 101 is small, or the display unit has a limitation on the number of input characters. In this regard, in this embodiment, the printing device 101 and the information processing apparatus 201 can be connected to the network via the display screen displayed on the display unit 208 of the information processing apparatus 201. Accordingly, the user can more easily connect the printing device 101 to the network than in the case of operating on the display unit of the printing device 101.

Second Embodiment

Figure 4:
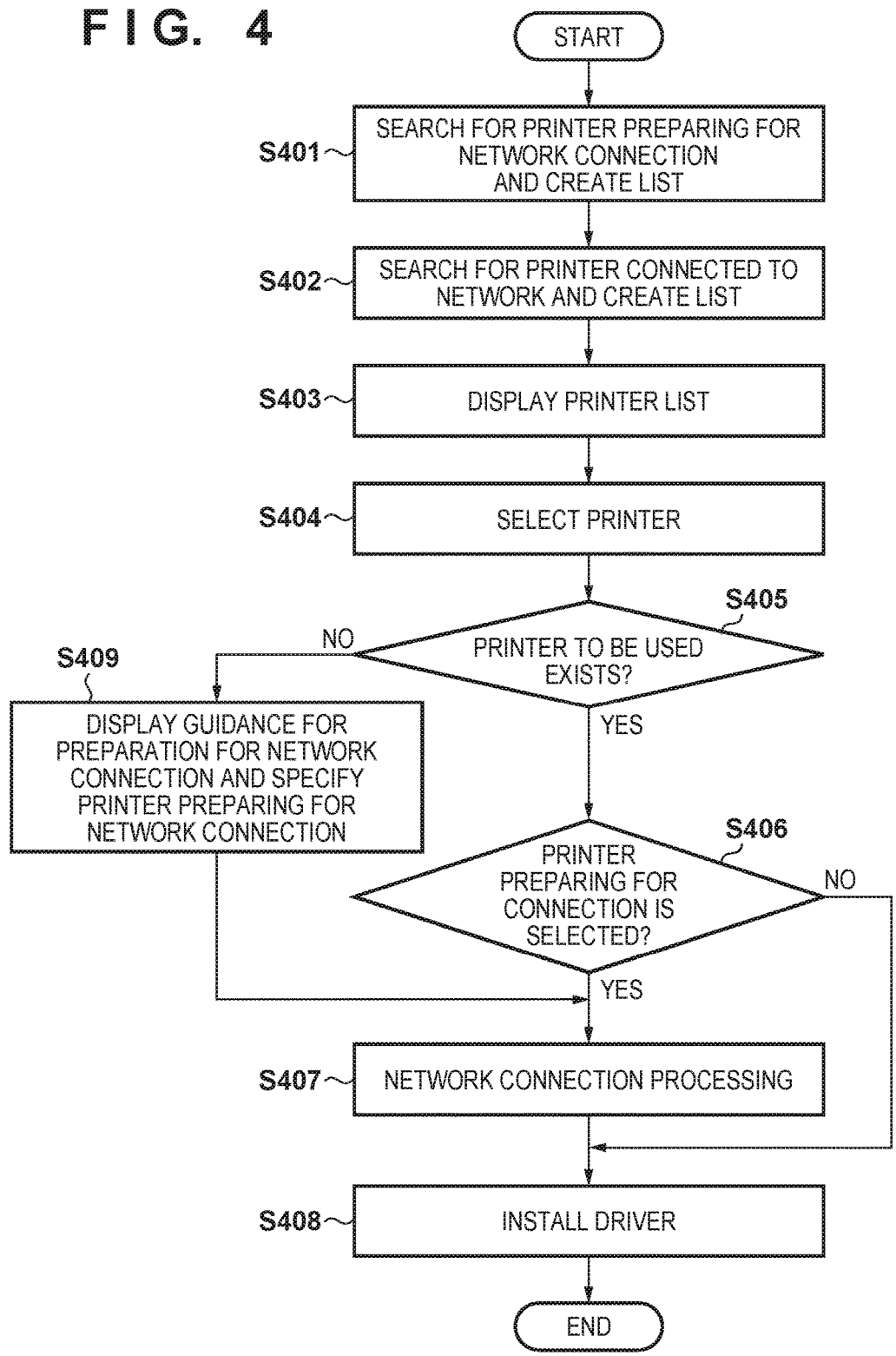
FIG. 4 is a flowchart of processing performed by the information processing apparatus 201.

The following description will focus on differences from the first embodiment, and the other features are similar to the first embodiment unless stated otherwise below. A description will be given, using a flowchart in FIG. 4, of processing performed by the information processing apparatus 201 in order to install driver software for the printing device 101 that is selected by the user in the information processing apparatus 201.

Since the processing in steps S401 to S404 and S406 to S408 are similar respectively to the processing in steps S301 to S304 and S305 to S307 in FIG. 3, descriptions of these steps will be omitted.

In this embodiment, in step S404, upon the user operating the keyboard 209 or the mouse 210 to designate any of the check boxes and then indicating the end of designation (i.e., selecting a printer), in step S405, the CPU 203 performs the following determination processing. In step S405, it is determined whether or not the printer to be used exists. In the window in FIG. 6, a check button 605 is for performing input in the case where information regarding the printing device that the user wants to select is not displayed in the display region 604. Therefore, if the user presses the "Next" button in a state of having designated (i.e., making a check mark in) the check button 605 using the keyboard 209 or the mouse 210, it is determined that the printer to be used does not exist (No in S405), and the processing proceeds to step S409. On the other hand, if the "Next" button is pressed in a state where the check button 605 is not designated, it is determined that the printer to be used exists (Yes in S405), and the processing proceeds to step S406.

The details of the processing in step S409 will be described using a flowchart in FIG. 5. In step S501, the CPU 203 displays a window, an example of which is shown in FIG. 7, on the display unit 208.

Figure 7:
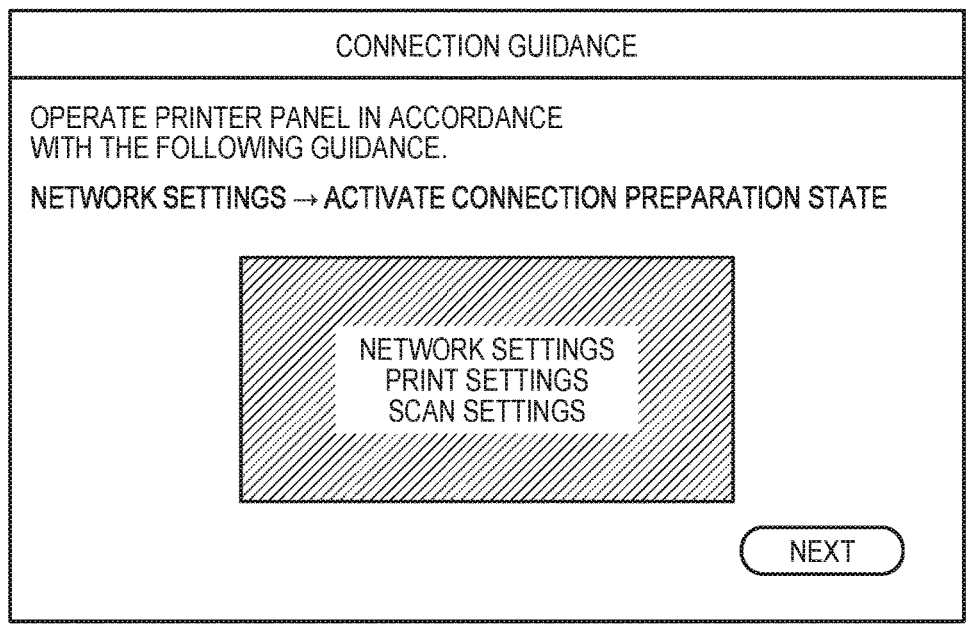
FIG. 7 is a diagram showing an exemplary display of a window.

The window in FIG. 7 is for notifying the user of the method for operating the printing device in order to cause the status of the printing device that the user wants to connect to the wireless LAN router 103 to transition to a connection preparation state. Although notification of the operation method based on the assumption that the printing device has a panel screen is given in FIG. 7, notification of an operation method using a button operation for achieving the same purpose may be given for a printing device that does not have a panel screen, or notification of both methods may be given simultaneously or in a selectable manner.

The user goes to the printing device that the user wants to connect to the wireless LAN router 103, operates the printing device in accordance with a message displayed in the window in FIG. 7, and causes the status of the printing device to transition to a connection preparation state. Then, the user again returns to the information processing apparatus 201, operates the keyboard 209 or the mouse 210 to designate the "Next" button on the window, an example of which is shown in FIG. 7, and the processing then proceeds to step S502.

In step S502, the CPU 203 performs the same processing as in the aforementioned step S301, thereby collecting, via the network interface 211, the SSID of the printing device 101 that is preparing for connection with the wireless LAN router 103. In step S502, furthermore, the CPU 203 creates, based on the collected SSID, a list of a serial number and an MAC address of the printing device 101 that corresponds to this SSID.

In step S503, the CPU 203 obtains a difference between the list created in step S401 and the list created in step S502 (an increment of the list created in step S502 from the list created in step S401). This difference is information regarding the printing device whose status has been caused to transition to a connection preparation state by means of the operation method described in the window displayed in step S501.

In step S504, the CPU 203 determines the difference obtained in step S503 to be a target printing device. After this determination is made, the processing proceeds to step S407. If the processing proceeds from step S504 to step S407, the same processing as the aforementioned step S306 is performed in step S407, and the target printing device at this time is the target printing device determined in step S504.

That is to say, in this embodiment, "the operation method for operating the device so as to achieve a state of preparing for connection with the network" is displayed in accordance with an instruction from the user, and after this display is performed, a device in a state of preparing for connection with the network is searched for again. Then, processing for connecting the device that corresponds to the difference between the search result (step S401) and the re-search result (step S502) to the network is executed.

Note that if the target printing device cannot be determined even after the processing in steps S503 and S504 is performed, the processing returns to step S501, and the subsequent processing is repeated. Note that after the processing in step S501, the processing may be advanced to step S401 without performing the processing in steps S502 to S504.

Thus, the user can more easily connect a desired printing device to the information processing apparatus.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-110809, filed May 29, 2015, which is hereby incorporated by reference herein in its entirety.

What is claimed is:

1. A control method for an information processing apparatus including one or more processors configured to execute the control method, the method comprising:

causing a display unit to display a screen including a message relating to a status change to a specific state of a connection target device;

specifying a first device as the connection target device based on first information, wherein the first information is acquired from the first device by a first search that is able to acquire information from a device that is not in a state of being connected to an external access point to which the information processing apparatus has connected; and causing a second search to be performed, wherein the second search is able to acquire information from a device that is already in a state of being connected to the external access point, wherein the screen including the message that causes a user to confirm the status change to the specific state of the first device is displayed, wherein wherein the first device is specified after the screen including the message is displayed and after the first device transitions to the specific state, wherein, in a case where the first device is specified, predetermined processing for transmitting setting information wirelessly to the specified first device is performed, wherein a connection between the specified first device and an external access point is performed based on the transmitted setting information, and wherein the external access point is provided outside of the information processing apparatus, the first device, and the device that is already in a state of being connected to the external access point.

2. The control method according to claim 1, wherein, in the case where the first information is acquired, a first display item based on the acquired first information is displayed, and wherein, in a case where the first display item is designated by a user, the first device is specified as the connection target device.

3. The control method according to claim 1, wherein, before the setting information is wirelessly transmitted to the first device, the information processing apparatus is disconnected from the external access point that has been connected thereto.

4. The control method according to claim 1, wherein the setting information used for a connection between the information processing apparatus and the external access point is transmitted to the first device.

5. The control method according to claim 1, wherein the setting information includes a SSID and a password.

6. The control method according to claim 1, wherein, in a case where second information is acquired from a second device by the second search, a second display item based on the acquired second information is displayed.

7. The control method according to claim 6, wherein, even in a case where the second display item is designated, predetermined processing for transmitting the setting information wirelessly to the second device is not performed.

8. The control method according to claim 1, wherein the first device has a function of an access point.

9. The control method according to claim 1, wherein a SSID of the first device is acquired by the first search and information based on the acquired SSID is displayed.

10. The control method according to claim 1, wherein an IP address is acquired from a second device by the second search and information based on the acquired IP address is displayed.

11. The control method according to claim 10, wherein an IP address is not acquired by the first search.

12. The control method according to claim 1, wherein a network provided by the external access point is a wireless LAN.

13. The control method according to claim 1, wherein the second search is performed by broadcast method.

14. The control method according to claim 1, wherein the setting information is transmitted to the first device in an ad hoc mode.

15. The control method according to claim 1, wherein, in a case where the first device is initially started, the first device automatically transitions to the specific state.

16. An information processing apparatus comprising:

at least one processor operating to:

cause a display unit to display a screen including a message relating to a status change to a specific state of a connection target device, specify a first device as the connection target device based on first information, wherein the first information is acquired from the first device by a first search that is able to acquire information from a device that is not in a state of being connected to an external access point to which the information processing apparatus has connected; and cause a second search to be performed, wherein the second search is able to acquire information from a device that is already in a state of being connected to the external access point, wherein the screen including the message that causes a user to confirm the status change to the specific state of the first device is displayed, wherein the first device is specified after the screen including the message is displayed and after the first device transitions to the specific state, wherein, in a case where the first device is specified, predetermined processing for transmitting setting information wirelessly to the specified first device is performed, wherein a connection between the specified first device and an external access point is performed based on the transmitted setting information, and wherein the external access point is provided outside of the information processing apparatus, the first device, and the device that is already in a state of being connected to the external access point.

* * * * *